E. A. SPERRY.
STEADYING DEVICE FOR VEHICLES.
APPLICATION FILED DEC. 2, 1907.
907,907.
Patented Dec. 29, 1908.
2 SHEETS—SHEET 2.
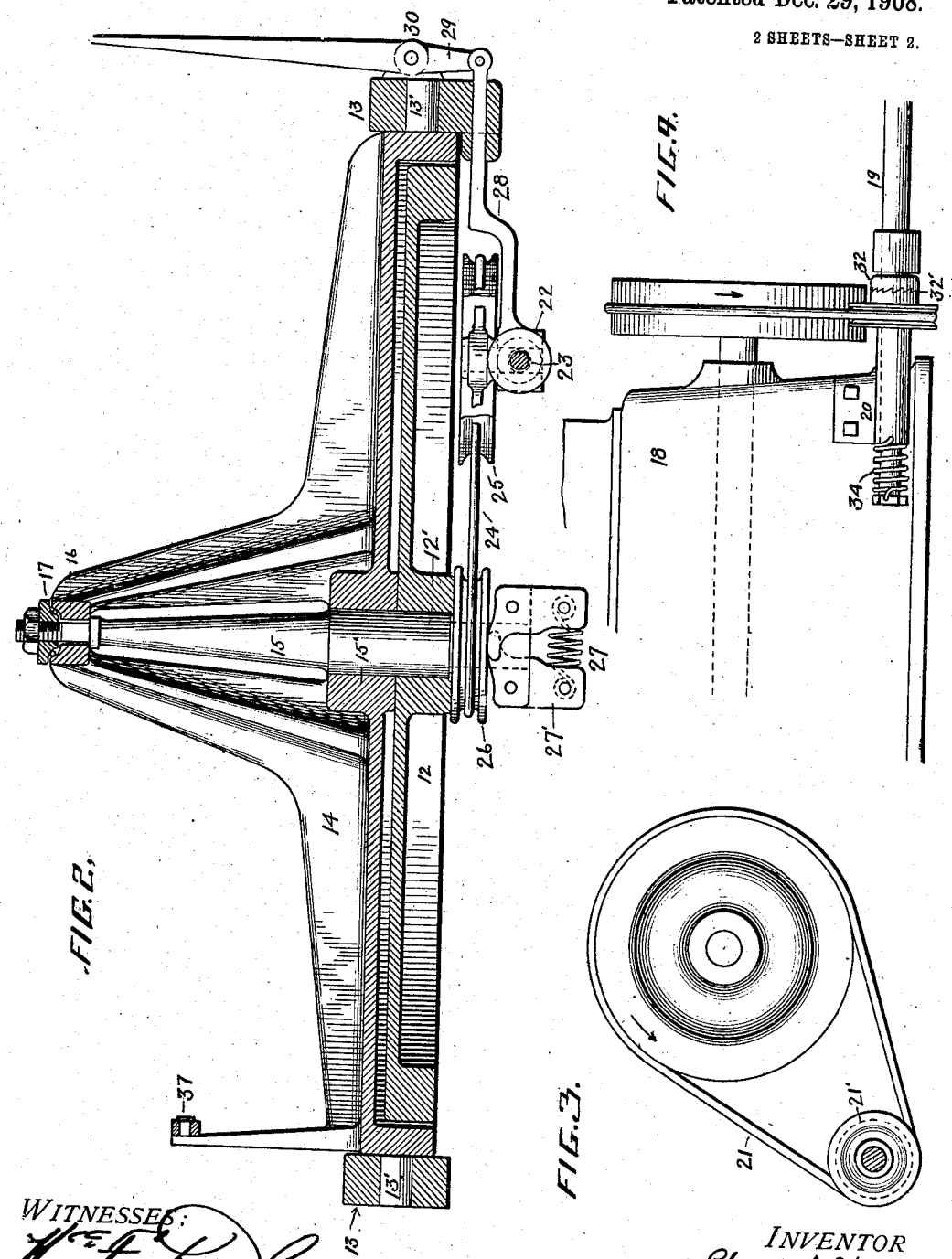
WITNESSES:
INVENTOR
Elmer A. Sperry.
by
Buckingham & Ewart
Attorneys

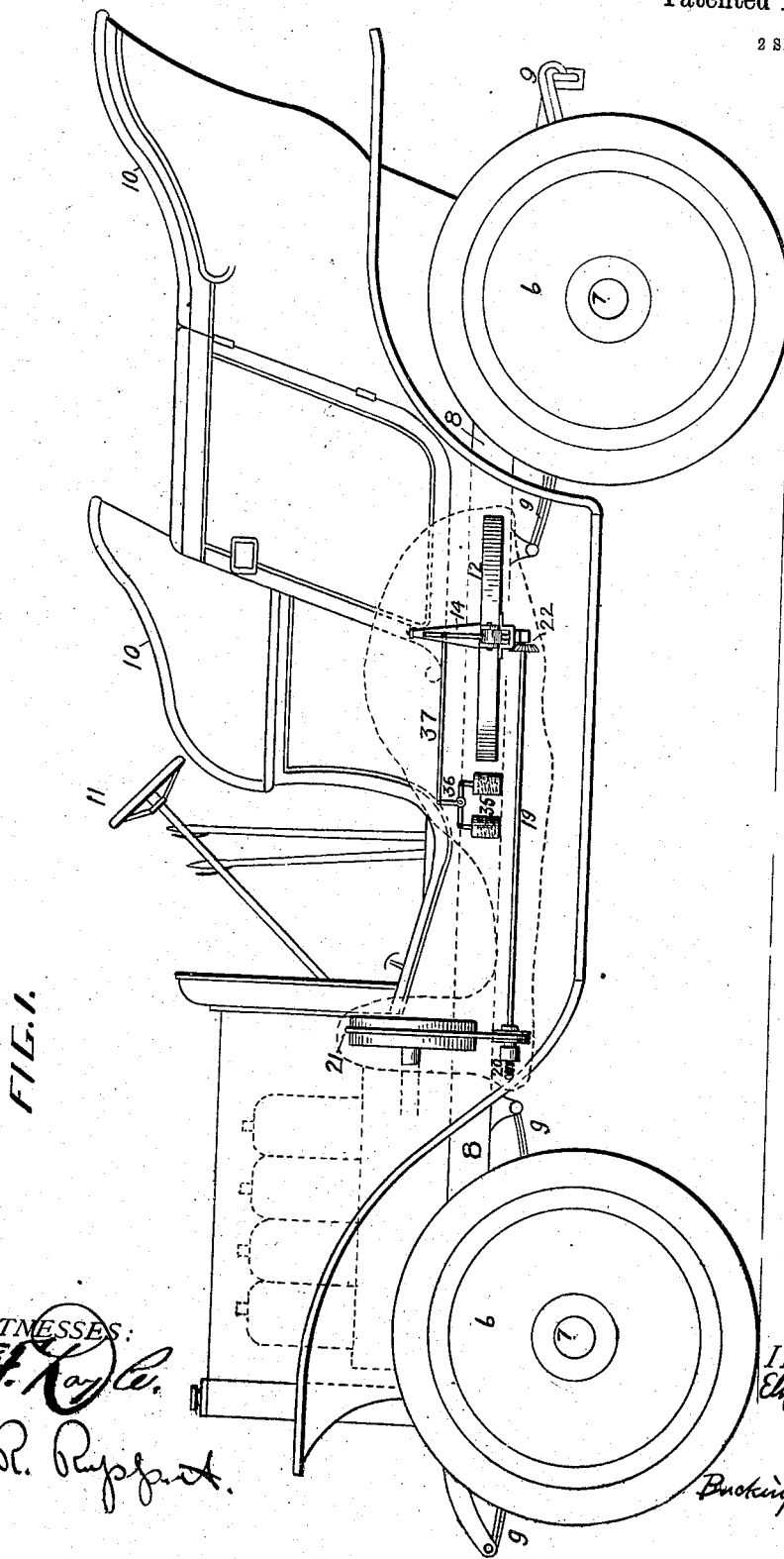

UNITED STATES PATENT OFFICE.

ELMER A. SPERRY, OF BROOKLYN, NEW YORK.

STEADYING DEVICE FOR VEHICLES.

No. 907,907.    Specification of Letters Patent.    Patented Dec. 29, 1908.

Application filed December 2, 1907. Serial No. 404,767.

*To all whom it may concern:*

Be it known that I, ELMER A. SPERRY, a citizen of the United States, residing at Brooklyn, in the county of Kings and State of New York, have invented new and useful Improvements in Steadying Devices for Vehicles, of which the following is a specification.

My invention relates to apparatus for steadying bodies susceptible of movement and especially susceptible of angular movement or movement about a point or axis, and it consists in so mounting one or more gyroscopic appliances upon such body as to derive therefrom opposing control, consisting in an effort opposed to a given motion which is of sufficient magnitude to extinguish such movement in whole or part.

To illustrate this invention it is shown as being mounted upon a vehicle, in the instance where one only of such gyroscopic appliances is so mounted as to effectively oppose lateral tipping of the body or truck and thus prevent lateral vibration, tipping, or sudden tipping over of such vehicle.

Figure 1 represents the side elevation, partially in section, of a vehicle equipped with one of the gyroscopic appliances. Fig. 2 shows a longitudinal section, showing the gyroscope pivoted to the frame of the truck with some parts removed. Fig. 3—is a view of a portion of the engine, its fly-wheel and a part of the gyroscope driving mechanism. Fig. 4 shows details.

It is well known that a revolving fly-wheel tends to exert gyrostatic influence but the popular notion that such a wheel exerts measurable gyrostatic effect is erroneous. The wheel, to exert "control" of any magnitude worth considering, must be peculiarly mounted and so organized as to be capable of angular motion in a plane at right angles to the motion impressed or received from the body, the oscillations of which it is desired to damp, control or extinguish. This is regardless of the plane in which the wheel rotates; where one is mounted for full realization of gyrostatic control, the plane in which the wheel revolves, should be selected with regard to other motions of the vehicle. For instance, if the vehicle is to be easily steered in a horizontal plane, the wheel should also run in such plane on a vertical axis. If lateral oscillations are to be controlled, the frame on which the wheel spins should be pivoted in a transverse plane and if the oscillations are to be extinguished and their energy absorbed by the gyroscope, the precessional movements or swing of the wheel frame should be made to deliver power to the mass in a longitudinal direction—in other words the appliance should include means for absorbing the power developed by the precessional swing of the wheel frame.

In the embodiment of my invention selected to illustrate its application, a vehicle such, for instance, as an automobile, may rest upon wheels (6) and axles (7), there being between truck (8) and the axle suitable springs—(9—9). The automobile may be provided with suitable seats, indicated at (10) and provided with means for steering the vehicle in a horizontal plane, consisting of the wheels (6) and the usual steering handle (11). Located in about the center of gravity of the mass of the vehicle, more particularly that portion of the vehicle above the springs, is mounted a fly-wheel (12), pivoted to the side frames (13) of the truck, as shown in Fig. 1 and Fig. 2. By means of a swinging frame (14) on which the vertical axle (15) of the spinning wheel is suitably journaled, as at (15') and (16), including also the thrust bearing (17), located above the upper journal. This wheel is driven by any suitable means, as for instance an electric motor mounted, as for instance upon swinging frame (14). As another means of driving such wheel and as illustrating a variable power connection between the driving motor of the car (18) and the spinning wheel (12) is a shaft (19) journaled upon the motor frame at (20) receiving its power in any suitable manner, as for instance by the belt (21) and at the other end delivering its power through a bevel gear (22) to a vertical shaft (23), which is so connected with the fly wheel as to permit of its to and fro movement through considerable angle. One means of accomplishing this is illustrated by belt (24) which connects wheels (25) and (26), the latter being loosely mounted below the fly-wheel hub (12'), by transmitting power through friction engagement therewith on a line of impingement, being brought about by the centripetal force of the little governor (27) fastened to a cross piece on the vertical shaft of wheel (12) and spinning therewith. The friction between the wheel (26), or the driving engagement of this wheel with wheel (12) is released by the centrifugal action of the weights (27') of the governor. Thus the speed of the fly-wheel (12) is automatically limited. The shaft 19 may be moved to and from the vertical shaft of the fly-wheel (12) by its frame (28) being loosely mounted under the side frame (13) of the truck and arranged to be thrown back and forth by link (29) working on longitudinal shaft (30) connected with a suitable hand control whereby the power driving belt may be tightened or loosened, or rendered inactive, entirely at the will of the operator.

Referring now to Fig. 3, it will be noticed that between the pulley wheel (21') and the shaft (19) or otherwise suitably located in the driving gear betwen the motor and the gyroscope wheel (12) there is located a uni-directional transmission, consisting, for purposes of illustration in this case, of ratchet teeth (32') connecting the disk upon the pulley (21') with disk (32) of driving shaft (19), the longitudinal movement of the teeth being taken up by spring (34) shown on the opposite side of the supporting journal 20, as between the end of shaft (19) and the back end of the thimble, supporting the belt wheel (21'). By means of this organization spasmodic spurts in speed on the part of the motor (18) are prevented from reaching the fly-wheel by the governor (27) on the one hand, while on the other the constant slow-downs or stopping of the motor are prevented from retarding the wheel by the uni-directional transmission mechanism.

The gyroscope frame (14) supporting as it does the fly-wheel (12) journaled thereon, is preferably pivoted to the truck at a point above its center of gravity, thereby permitting it to perform the function of a pendulum upon its pivots 13'—13'. To absorb power developed by the swinging motions of the gyroscope, any connected mechanism may be employed, as for instance a dash pot or dash pots—or cylinders (35)—(35) the pistons of which are suitably driven by lever (36), connected with the swinging frame 14 by pitman (37). Suitably connected at any point with the swinging frame 14 is a centralizing device which in the present instance is located in the bottom of the dash pots and serves the double purpose of more quickly returning the frame to its central position when more powerful influences are absent, and to limit through the cushioning action of such springs, the precessional movement of the gyroscope.

The use and operation of my device will be readily understood from the foregoing; it may however be pointed out that a comparatively light wheel which will easily fit in between the sides of the standard chassises when spinning with a very large margin of safety, is found to exert very powerful control. For instance, suppose this wheel to be somewhat less than 200 lbs. in weight, it can easily be shown that under proper conditions of its precessional movements, it can be made to develop considerably more than four (4) ft. tons of energy, which is available for steadying sidewise oscillation and prevention of the vehicle as a whole from suddenly tipping over, the practical results of the operation being that when one or both of the wheels on one side of the vehicle are off the roadbed, they are at first hanging in mid-air by the gyroscopic action to the extent of energy named, which exerts its force through quite an interval—for it is true that the two side wheels may be run out over an embankment without tipping the vehicle, provided they are swerved back onto the roadbed before too great lapse of time.

Wheel 12 is kept spinning through the mechanism described, either from its own motor or from the vehicle motor. The power may be detached at will; the motor may be run above or below its normal speed without interfering with the regular rotation of fly-wheel 12, by means of the governor 27 on the one hand and the uni-directional device 31 on the other. The power delivered to the gyroscopic device is quickly and readily absorbed by the dash pots or cylinders 35—35 which serve also to sufficiently retard and properly arrest the precessional movements of the swinging frame 14.

The word gyroscope as used in this specification relates to the wheel 12 and its frame 14; to be strictly accurate these parts considered by themselves constitute a gyrostat but when in place on a vehicle and under such angular movement thereof as will set up precessional movements of the parts, the combination then constitutes a gyroscope in the true sense of the term.

It will be readily understood that the precise location and combination of the parts herein shown for the purposes of illustration of one embodiment of my invention, need not in all cases be followed but some elements may be omitted and others be substituted therefor within the scope of the claims and the invention extends to such use.

I claim:

1. In a wheeled vehicle a dirigible running gear for the vehicle, a spring supported body for the vehicle and a gyroscope pivoted to the body of such vehicle.

2. In a wheeled vehicle a dirigible running gear for the vehicle, a spring supported body for the vehicle and a gyroscope pivoted to the body of such vehicle upon a transverse axis.

3. In a wheeled vehicle a dirigible running gear for the vehicle, a spring supported body for the vehicle and a gyroscope pivoted to the body of such vehicle, the rotor of the gyroscope being adapted to spin on a normally vertical axis.

4. In a wheeled vehicle a dirigible running gear for the vehicle, a spring supported body for the vehicle and a gyroscope pivoted to the body of such vehicle, on a vertical line passing near the center of gravity of the body.

5. In a wheeled vehicle a dirigible running gear for the vehicle, a spring supported body for the vehicle and a gyroscope pivoted to the body of such vehicle, the gyrating axis being above the center of gravity of the rotor.

6. In a wheeled vehicle a dirigible running gear for the vehicle, a spring supported body for the vehicle and a gyroscope pivoted to the body of such vehicle, the gyroscope having a precessional movement, and means for returning such movement.

7. In a wheeled vehicle, a gyroscope pivoted to the vehicle and adapted to spin on a vertical axis, a source of power upon the vehicle and a flexible power connection from the source to the gyroscope.

8. In a wheeled vehicle, a gyroscope pivoted to the vehicle, and adapted to spin on a vertical axis, a source of power upon the vehicle and a variable power connection from the source to the gyroscope.

9. In a wheeled vehicle a dirigible running gear for the vehicle, a spring supported body for the vehicle and a gyroscope pivoted to the body of such vehicle, the gyroscope having a precessional movement, and means for limiting the precessional movement.

10. In a wheeled vehicle, a gyroscope pivoted to the vehicle and adapted to spin on a vertical axis, a source of power upon the vehicle, a connection from the source to the gyroscope and means for automatically interrupting the connection.

11. In a wheeled vehicle a dirigible running gear for the vehicle, a spring supported body for the vehicle and a gyroscope pivoted to the body of such vehicle, and a centralizing device for the pivoted member of the gyroscope.

12. In a wheeled vehicle, a gyroscope pivoted to the vehicle and adapted to spin on a vertical axis, and means for automatically limiting the speed of the gyroscope.

In testimony whereof I have hereunto set my hand in presence of two subscribing witnesses.

ELMER A. SPERRY.

Witnesses:
  E. A. SPERRY, Jr.
  E. G. SPERRY.